Nov. 27, 1951 — M. TOTH — 2,576,316
RADIATOR INSTALLATION FOR MOTOR VEHICLES
Filed Nov. 28, 1947 — 3 Sheets-Sheet 1
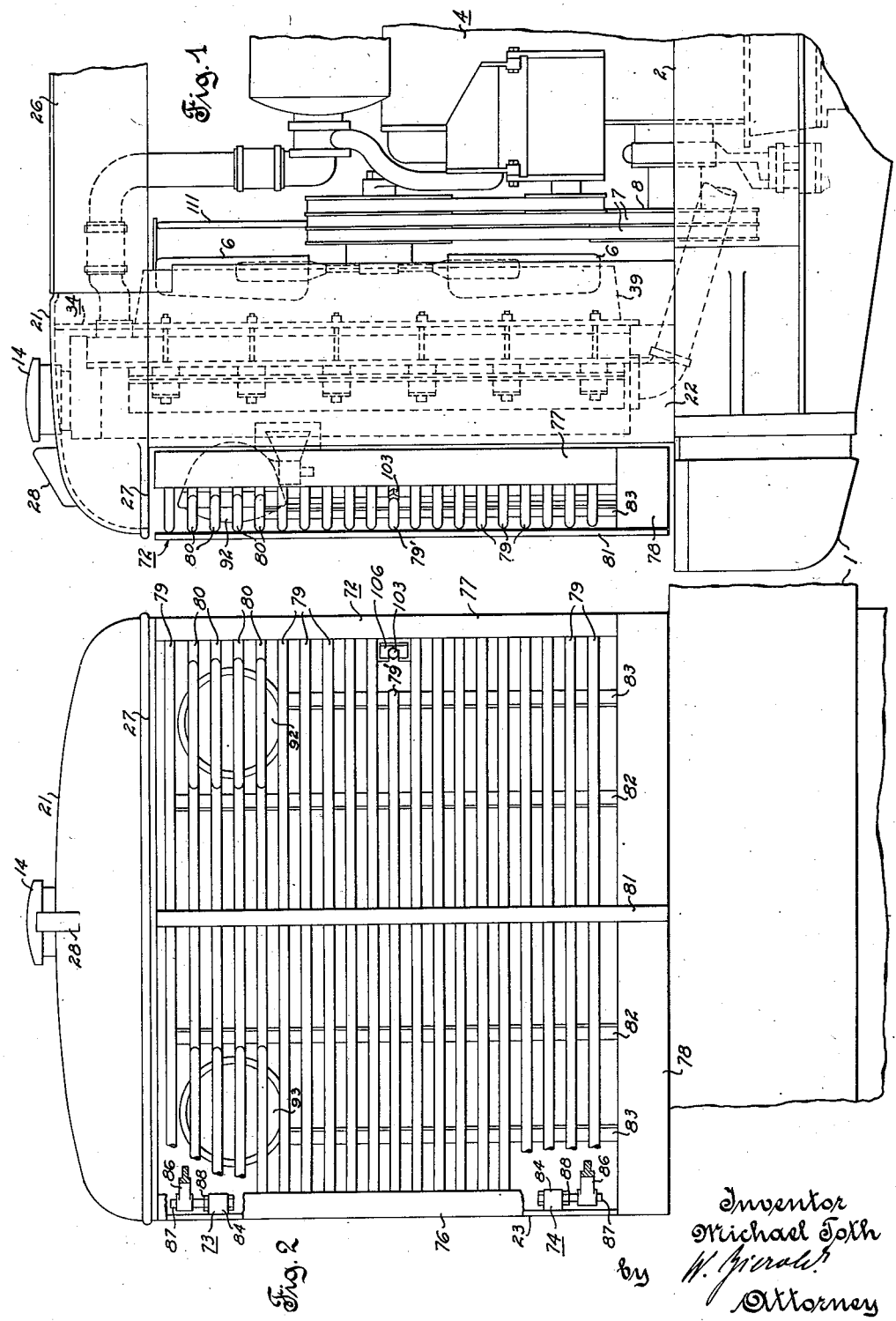

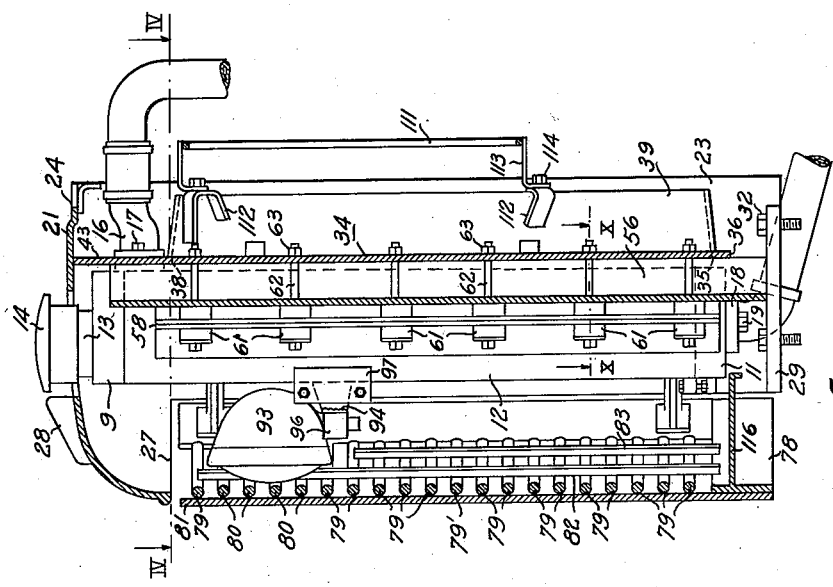

Nov. 27, 1951 M. TOTH 2,576,316
RADIATOR INSTALLATION FOR MOTOR VEHICLES
Filed Nov. 28, 1947 3 Sheets-Sheet 3
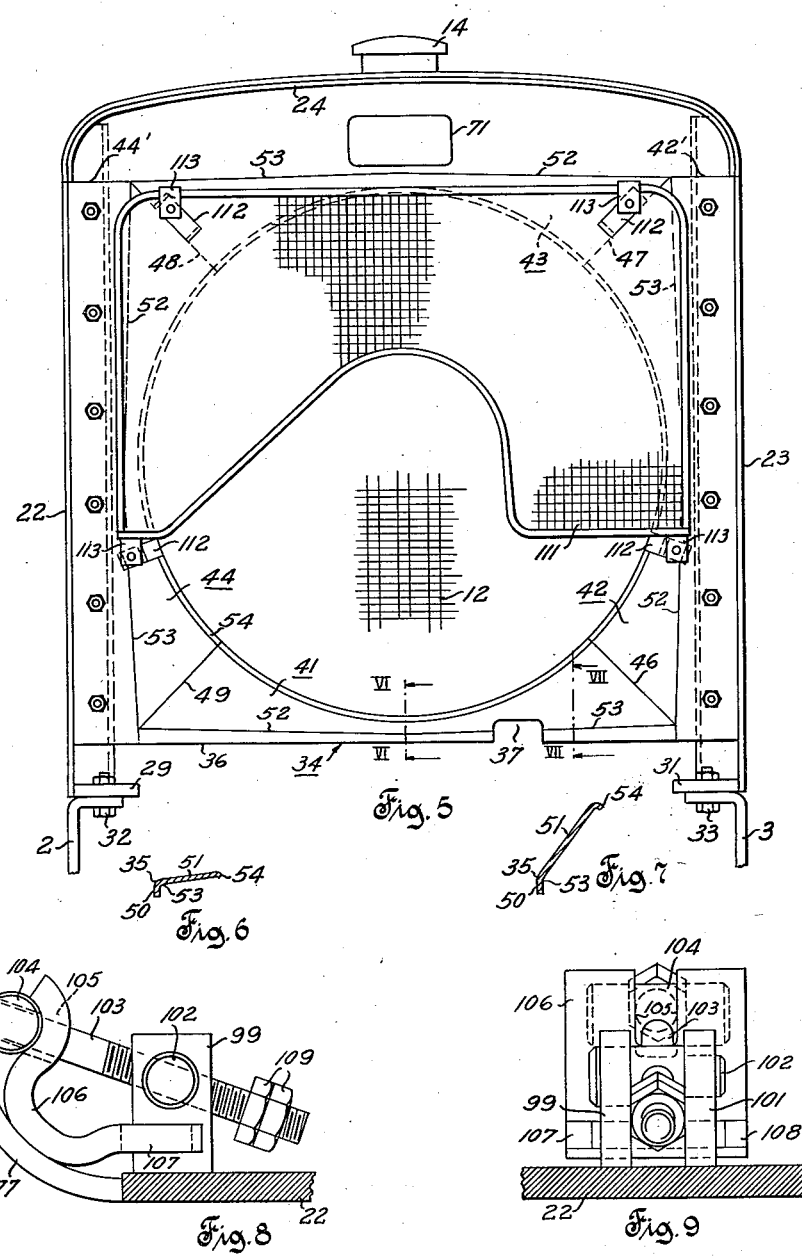
Inventor
Michael Toth
by
Attorney Patented Nov. 27, 1951

2,576,316

UNITED STATES PATENT OFFICE 2,576,316

RADIATOR INSTALLATION FOR MOTOR VEHICLES

Michael Toth, Springfield, Ill., assignor to Allis-Chalmers Manufacturing Company, Milwaukee, Wis., a corporation of Delaware Application November 28, 1947, Serial No. 788,335

1 Claim. (Cl. 180—68)

The invention relates to radiator installations for motor vehicles, and it is concerned more particularly with an enclosing structure for the radiator proper, that is, with an enclosing structure for a tank and core assembly which forms the heat exchanger of the installation.

In heavy duty motor vehicles, such as tractors, and which are equipped with a shell structure for protecting and concealing the top and sides of the radiator, such shell structures have heretofore been constructed of sheet or plate metal, and in certain instances of the prior art a self-contained radiator unit comprising an upper and a lower tank and a finned tube assembly, has been connected in supported relation with such shell structure. In such installations it has been observed that the radiator unit is apt to become leaky due to weaving and flexing of the shell structure during operation of the vehicle, and this difficulty has been found to be aggravated in motor vehicles which require a radiator of relatively large capacity and a correspondingly large size radiator shell.

Generally, it is an object of the invention to provide an improved sheet or plate metal radiator shell which will take care of the requirement for substantial stiffness or rigidity of the shell in a practical and relatively simple manner.

More specifically, it is an object of the invention to provide an improved form of internal reinforcement for a sheet or plate metal radiator shell, which will render such shell adequately strong so that it will not only support itself under severe operating conditions of the motor vehicle, but so that it may also safely serve as a support for various accessories, as for instance a self-contained radiator unit, a swingable grill structure for the shell, and/or various types of allied equipment for the motor vehicle.

These and other objects and advantages are attained by the present invention, various novel features of which will be apparent from the description herein and the accompanying drawings disclosing and embodiment of the invention, and will be more particularly pointed out in the accompanying claim.

Referring to the drawings:

Fig. 1 is a side view of a radiator installation for a motor vehicle;

Fig. 2 is a front view of the installation shown in Fig. 1, parts of the grill being broken away to expose a pair of hinges;

Fig. 3 is a sectional side view showing radiator parts of Fig. 1 in elevation and shell and grill parts in section on line III—III of Fig. 4;

Fig. 4 is a sectional top view showing radiator and grill parts of Fig. 1 in elevation, and shell parts in section on line IV—IV of Fig. 3;

Fig. 5 is a rear view of shell, radiator and other parts shown in Fig. 1;

Figs. 6 and 7 are sectional views on lines VI—VI and VII—VII, respectively, of Fig. 5;

Fig. 8 is an enlarged top view of a latch mechanism shown in Fig. 4;

Fig. 9 is a rear view of the latch mechanism shown in Fig. 8; and

Fig. 10 is an enlarged detail view in section on line X—X of Fig. 3.

Referring to Figs. 1, 2 and 5, a heavy cross member 1 forms the front bumper of a heavy duty motor vehicle, such as a crawler tractor (not shown), and horizontally spaced side members 2 and 3 (Fig. 5) of the vehicle frame are rigidly connected, at their forward ends, to the cross member 1 in conventional manner. An internal combustion engine 4, the forward part of which is shown in Fig. 1, is mounted between the side frame members 2 and 3 in rearwardly spaced relation to the front cross member 1; and in conformity with accepted practice, a radiator cooling fan 6 is operatively mounted in front of the engine and driven by belts 7 from a pulley 8 on the crank shaft of the engine.

A radiator shell in front of the engine 4 is mounted, as shown in Figs. 1 and 5, on the side members 2 and 3 of the vehicle frame, and mounted within said shell, as will be more fully explained hereinbelow, is a self-contained radiator unit which comprises a top tank 9, a bottom tank 11, and a finned tube assembly or core 12 (Fig. 3). The radiator tanks and tubes are interconnected and function in conformity with well-known principles, and the entire radiator unit is of relatively light and correspondingly inexpensive construction. The top tank 9 has a filler stud 13 which carries a closure cap 14, and a flanged fitting 16 for connecting the upper tank 9 with the water jacket of the engine is detachably secured to the rear wall of the upper tank by cap screws 17, as shown in Figs. 3 and 4. The lower tank 11 has a bottom opening to which a flanged fitting 18 is detachably secured by cap screws 19 for connecting the lower tank with the water jacket of the engine.

The shell, which as shown protects and conceals the top and sides of the radiator unit, comprises a top member 21 in the form of a dome shaped sheet metal stamping; and a pair of relatively opposed side members 22 and 23, in the form of vertical, substantially rectangular, sheet metal plates which merge at their upper ends with vertical side wall portions of the top member 21, the latter and the side members 22 and 23 being preferably formed separately and welded together at the straight horizontal upper edges of the side members. The dome shaped top member 21 has a recessed rearward skirt portion 24 (Fig. 3) which affords a seat for an engine bonnet 26 (Fig. 1), and the forward portion of the top member 21 is vertically and horizontally curved and terminates in a horizontal edge 27 which is curved transversely of the vehicle. A deflector 28 is secured to the top member 21, as by welding, in front of the radiator cap 14 for purposes of protection. As best shown in Fig. 5, the side plates 22 and 23 of the shell are connected with the side members 2 and 3, respectively, of the vehicle frame by means of foot plates 29 and 31, and bolts 32 and 33, the foot plates being welded to the lower ends of the side plates at the inner sides of the latter. As shown in Fig. 4, the bolts 32 and 33 extend through holes at the rear ends of the foot plates 29 and 31, respectively, and an additional set of bolts (Fig. 3) is provided to secure the foot plates at their forward ends to the side members 2 and 3, respectively, of the vehicle frame.

The shell part formed by the top member 21 and by the side members 22 and 23 is internally reinforced by a web generally designated by the reference character 34, and which is shown in section in Figs. 3 and 4, and part of which is shown in rear elevation in Fig. 5. The horizontal width of the web conforms substantially with the transverse spacing between the inner surfaces of the side members 22 and 23, and welded seams along the straight opposite side edges of the web connect the latter with the side plates 22 and 23 at the inner sides of the latter. As shown in Fig. 3, the web 34 extends upwardly into the dome shaped top part 21 of the shell, and the upper edge of the web is curved to conform with the curvature of the inside surface of the top part 21. In addition to being secured to the side members 21 and 22, the web 34 is secured by a welded seam along its upper edge to the inside surface of the top part 21. The lower edge 36 of the web is spaced upwardly from the horizontal plane of the foot plates 29, 31, and has a cutout 37 for accommodating the fitting 18 of the radiator unit.

Associated with the web 34 is a tapered fan shroud 39 which terminates at its wide end in a large, generally square fenestral aperture of the web 34, the lower and upper edges of the fenestral aperture being designated in Fig. 3 by the reference characters 35 and 38, respectively, and the height and width of the fenestral aperture conforming substantially with the height and width, respectively, of the core 12 of the radiator unit. The fan 6 operates to draw air rearwardly through the core section of the radiator unit and through the fenestral aperture of the reinforcing web 34. The tapered fan shroud 39 extends rearwardly from the web 34 into axially overlapping relation with the fan 6, and serves to direct the cooling air through the radiator shell.

Referring to Fig. 5, the structure forming the web 34 and the fan shroud 39 comprises four die-shaped plate members or reinforcing plates 41, 42, 43 and 44, which are joined together by welded seams along diagonal lines 46, 47, 48 and 49. The bottom section 41 has a relatively short skirt portion 50, best shown in Figs. 6 and 7, which extends vertically in the plane of the web 34, and a slanting portion 51. The slanting portion 51 merges with the skirt portion 50 along crease lines 52 and 53 which are slightly inclined relative to each other, as shown in Fig. 5, and the bottom edge 35 of the fenestral aperture of the web 34 extends along said crease lines 52 and 53. The slope of the slanting portion 51 is relatively steep at the center of the section 41, as shown in Fig. 6, and becomes gradually more gentle at the lateral parts of the section 41, as indicated by Fig. 7. The plate members 42, 43 and 44 are shaped similar to the plate member 41, but the skirt portions of the plate members 42 and 44, as shown in Fig. 4, and the skirt portion of the plate member 43, as shown in Fig. 3, are wider than the skirt portion of the plate member 41. In Fig. 5, the reference characters 52 and 53 have also been applied to the crease lines of each of the plate members 42, 43, and 44. The vertical edges of the fenestral aperture at the wide end of the fan shroud 39 extend along the crease lines of the plate members 42 and 44, respectively, and the top edge 38 of the fenestral aperture extends along the crease lines of the plate member 43. The bottom edge 36 of the web 34 extends in line with lower horizontal edge portions of the plate members 42 and 44, and the skirt portion of the top plate member 43 is joined with horizontal top edges of the plate members 42 and 44 on lines 42' and 44', respectively, as shown in Fig. 5. The fan shroud 39 has a circular, beaded rear edge 54 surrounding the fan 6 substantially in the center plane of the latter.

The top and side members 21, 22 and 23 of the shell, as well as the reinforcing plates 41 to 44, are formed of relatively heavy gauge sheet metal stock, and suitable blanks for the plates 41 to 44 are cut from such stock and shaped between a pair of dies before the plates are welded together and to the shell, as shown in Fig. 5. The web 34 and the fan shroud 39 coact to stiffen the web by the fan shroud and, conversely, to stiffen the fan shroud by the web, and the combined web and fan shroud afford an ample reinforcement for the shell 21, 22, 23 to render the latter adequately strong so that it will not only support itself under severe operating conditions of the motor vehicle on which it is mounted, but so that it may also safely serve as a support for various accessories, such as the radiator unit 9, 11, 12, and/or a swingable grill structure for the shell, as will be described more fully hereinbelow.

Referring to Figs. 3 and 4, a pair of vertical reinforcing angles 56 and 57 are positioned, respectively, at the inner sides of the side plates 22 and 23, each reinforcing angle having one flange thereof set on edge against the front face of the reinforcing web 34, and its other flange set on edge against the respective side plate. The reinforcing angle 56 extends all the way from the foot plate 29 into the top member 21, and it is secured by a welded seam along the edge of its front flange to the inner side of the plate 22 and to the inner side of the top member 21, and by another welded seam along the edge of its side flange to the front face of the web 34. At its lower end, the reinforcing angle 56 is also welded to the foot plate 29. The reinforcing angle 57 is similarly secured to the inner side of the plate 23, to the inner side of the top member 21, to the front face of the web 34, and to the foot plate 31.

The fan shroud 39 and the radiator unit comprising the tanks 9 and 11 and the tube assembly 12 are arranged at opposite sides, respectively, of the reinforcing web 34, and the tube assembly 12 is positioned in confronting relation to the wide end of the tapered fan shroud 39.

In the embodiment of the invention which has been selected for illustration by the drawings, the mentioned reinforced structure includes the reinforcing angles 56 and 57, and the radiator unit is mounted on and supported by these reinforcing angles. To that end, a pair of mounting fins 58 and 59 are formed at opposite sides, respectively, of the radiator unit, and six vertically spaced rubber mounts 61 are arranged at each side of the radiator unit for connecting the fin 58 with the angle 56, and for connecting the fin 59 with the angle 57. As shown in Fig. 3, the rubber mounts 61 in front of the angle 56 are supported, respectively, by bolts 62, each of these bolts extending through the front flange of the angle 56 and through the web 34, and carrying a nut 63 in rear of the web 34. The rubber mounts 61 in front of the angle 57 are similarly supported, respectively, by bolts 62 which extend through the front flange of the angle 57 and through the portion of the web 34 in rear of said flange (Fig. 4).

The details of construction are the same for all of the rubber mounts 61 and are shown more clearly in Fig. 10. As shown in said figure, a metal sleeve 64 surrounding the shank of the bolt 62 is in turn surrounded by a rubber sleeve 66, and both sleeves extend through an aperture of the mounting fin 58. Rubber rings 67 and 68 surround the sleeve 66 in front and rear, respectively, of the fin 58. The head of the bolt 62 bears against a metal washer 69, and in the condition of the parts as shown in Fig. 10, the rubber sleeve 66 and the rubber rings 67 and 68 are in a state of axial compression which is obtained by tightening of the nut 63 on the bolt 62 until the washer 69 bears upon the sleeve 64. The fin 58 is thus resiliently clamped in vibration dampening relation to the angle 56, and it will be understood that the fin 59 is similarly clamped in vibration dampening relation to the angle 57.

The web 34 has a rectangular opening 71 (Fig. 5) in its upper part which accommodates the connecting flange of the fitting 16 when the radiator unit is mounted in operative position as shown in the drawings.

Referring to Figs. 1 and 2, a grill, generally designated by the reference character 72, extends in front of the radiator unit below the forwardly overhanging part of the top member 21 of the radiator shell. The grill 72 comprises an assembly of horizontal and vertical members which are rigidly interconnected to form a gate structure which is hinged to the radiator shell by means of a pair of hinges 73 and 74, as shown at the left of Fig. 2. Vertical side strips 76 and 77 of the grill are connected at their lower ends to a transverse plate strip 78, and terminate at their upper ends in proximity to the horizontal edge 27 of the top member 21 of the shell. Next to the edge 27, the side strips 76 and 77 are connected with each other by a horizontally disposed round grill bar 79 which extends in a curved vertical plane as shown in Fig. 4, the curvature of said plane conforming with the horizontal curvature of the edge 27. Below the top grill bar 79 the side strips 76 and 77 are connected with each other by a group of four round grill bars 80, which generally follow the curvature of the mentioned plane, but portions of which are curved out of said plane and form head lamp receiving cavities 89 and 91, at the inner side of the grill, as shown in Fig. 4. Below the group of grill bars 80, the side strips 76 and 77 are connected with each other by a group of five round grill bars 79 which are duplicates of the top grill bar 79 and extend in the same curved plane as the latter. One grill bar 79' approximately midway between the top and bottom of the grill, is connected at its left end, in Fig. 2, with the side strip 76, and terminates at its right end a short distance from the side strip 77, to provide access to a latch mechanism which will be described more fully hereinbelow. The grill bar 79' extends in the same curved plane as the top grill bar 79. Below the grill bar 79', the side strips 76 and 77 are connected with each other by a group of nine grill bars 79 which are duplicates of the top grill bar 79 and extend in the same curved plane as the latter.

A vertical center strip 81 at the forward side of the grill is connected to each of the grill bars 79, 79' and 80, and to the plate strip 78. At the inner side of the grill, the bars 79, 79' and 80 and the plate strip 78 are interconnected by a pair of vertical relatively long strips 82 and 82, and another inner pair of relatively shorter vertical strips 83 and 83 are connected to the bottom strip 78 and also to the grill bars 79 and 79' below the grill bars 80.

The upper hinge 73 comprises a block 84 which is welded to the inner side of the side plate 23 of the shell, and a curved hinge arm 86 (Fig. 4) which is welded to the inner side of the vertical side member 76 of the grill, and which is pivotally connected with the block 84 by a bolt 87. The shank of the bolt 87 extends through a bore of the block 84 and is screwed into a tapped hole of the hinge arm 86. A stop nut 88 (Fig. 2) on the bolt 87 rests on the block 84 and is suitably locked in adjusted position to secure the bolt 87 in rotatable and axially fixed relation to the block 84.

The foregoing explanations with respect to the construction of the upper hinge 73 similarly apply to the lower hinge 74, the parts of the lower hinge being designated by the same reference characters as the corresponding parts of the upper hinge. The described construction of the hinges 73 and 74 permits up and down adjustment of the grill relative to the shell by rotary adjustment of the bolts 87 in the tapped holes of the hinge arms 86.

It will be noted that the grill 72 is swingable about a vertical axis at the inner side of the side member 23 of the shell, and that the grill may be swung about said axis from the transverse position between the side members 22 and 23 of the shell, in which it is shown in Fig. 4, into an open position which will expose the radiator unit for inspection and cleaning, and for removal of the entire radiator unit forwardly from the shell, for purposes of repair when necessary.

A pair of head lamps 92 and 93 which project into the cavities 89 and 91, respectively, of the grill when the latter is closed, as shown in Fig. 4, are mounted on the radiator unit by means of brackets 94 and 96, respectively. The bracket 94 is bolted to a plate 97 (Fig. 3) which is secured to the side of the radiator unit in front of the mounting fin 58, and the head lamp bracket 96 is similarly bolted to a plate 98 which is secured to the side of the radiator in front of the mounting fin 59.

Referring to Figs. 2 and 4, a latch mechanism is operatively interposed between the shell and the swinging side of the grill 72 in order to releasably secure the grill in its closed position in which it is shown in said figures. The details of construction of the latch mechanism are shown more clearly in Figs. 8 and 9, and as shown in these figures, a pair of bracket plates 99 and 101 are secured in vertically spaced relation to each other on the inner side of the plate member 22. A swivel pin 102 is pivotally mounted at its opposite ends in the bracket plates 99 and 101, and a latch bolt 103 is screwed into a threaded bore of the swivel pin 102 for adjustment in the direction of its axis and transversely of the swivel pin 102, between the bracket plates 99 and 101. A cross pin 104 is swiveled on the latch bolt 103 and is seated in a hooked end of a bracket 106 which is secured to the inner side of the side strip 77 of the grill. The hooked end of the bracket 106 has an open ended slot 105 accommodating the shank of the bolt 103; and a pair of prongs 107 and 108, at the other end of the bracket 106, straddle the bracket plates 99 and 101 so as to secure the swinging side of the grill 72 against up and down movement relative to the side plate 22 of the shell. The latch bolt 103 carries a pair of stop nuts 109 rearwardly of the bracket plates 99 and 101.

Fig. 8 shows the latch mechanism in its locked condition in which it secures the grill against swinging movement about the axis of the hinges 73 and 74. The head of the bolt 103 is accessible through the space between the grill bars 79 above and below the grill bar 79', as shown in Fig. 2, and in order to unlock the latch, the bolt 103 is turned so as to permit unseating of the cross pin 104 (Fig. 8) from the hooked end of the bracket 106. The bolt 103 together with the cross pin 104 may then be swung about the axis of the swivel pin 102 so as to release the grill for swinging movement about the axis of the hinges 73 and 74. In order to lock the grill in its closed position, the latch bolt 103 is swung back into the slot of the hooked end of the bracket 106 and it is then turned so as to force the cross pin 104 upon the hooked end of the bracket 106.

It will be noted that the hinges 73 and 74 and the latch mechanism comprising the bolt 103, are located between the planes of the side plates 22 and 23 of the shell, and accordingly, neither the hinges nor the latch mechanism interfere with the up and down movement of bulldozer arms or the like which may be mounted on the vehicle and extend forwardly beyond the radiator shell in close proximity to the opposite sides of the latter.

The fan 6 is operative, as stated hereinbefore, to draw air rearwardly through the core section 12 of the radiator unit, and as best shown in Figs. 1 and 5, a protecting screen 111 for the fan is mounted in rear of the latter on the fan shroud 39 by means of strap metal brackets 112 which are spaced from each other circumferentially of the fan shroud 39, and which are welded to the outer surface of the latter. The screen 111 has suitable spacer clips 113 which are connected with the brackets 112 by bolts 114.

Referring again to Fig. 3, the grill 72 has a baffle 116 which, in the closed position of the grill, extends horizontally a short distance under the radiator unit in close proximity to the bottom side of the latter. The baffle plate 116 has a curved forward edge whose curvature conforms with the curvature of the inside surface of the plate strip 78 of the grill, and the baffle is welded along its curved forward edge to the inner side of the plate strip 78. The baffle plate 116 is properly dimensioned so as to substantially seal the horizontal gap between the radiator unit and the plate strip 78 of the grill when the latter is in its closed position, and accordingly, when the fan 6 is operative to draw air rearwardly into the shell, the baffle 116 will be operative to direct such air toward the radiator unit.

In general terms, the herein disclosed improved motor vehicle front assembly comprises a plate metal top section, a pair of upright plate metal side sections under said top section and connected with the latter to form an inverted U-shaped structure, said top section having an upwardly arched wall portion spanning said side sections, and a forwardly extended portion overhanging the front edges of said side sections and closed at its top, front and sides. In the illustrated embodiment of the invention, the mentioned plate metal top section is represented by the dome shaped sheet metal stamping 21, and the mentioned side sections are represented by the side members 22 and 23.

At the lower ends of the side sections of the inverted U-shaped structure are means for rigidly mounting the latter on a pair of transversely spaced frame members of a motor vehicle, such means being represented in the illustrated embodiment of the invention by the foot plates 29 and 31 and by the bolts 32 and 33.

The improved motor vehicle front assembly further comprises a web member secured to and extending from the inner sides of said side sections and being dished to form a fan shroud within said U-shaped structure, said web member having an upper edge portion connected with the inner side of said upwardly arched wall portion of the top section, and being formed of plate material of substantial thickness so that said U-shaped structure will be substantially reinforced by said web member. In the illustrated embodiment of the invention such web member comprises the four plate members 41, 42, 43 and 44 which are die-shaped and welded together, the web member as a whole being dished to form the fan shroud 39. Means are connected with the web member for securing a radiator unit within the U-shaped structure rearwardly of said forwardly extended portion of the latter, such means in the illustrated embodiment of the invention including the bolts 62.

It should be understood that it is not intended to limit the invention to the particular forms and details described hereinabove and that the invention includes such other forms and modifications as are embraced by the scope of the appended claim.

It is claimed and desired to secure by Letters Patent:

A motor vehicle front assembly comprising, in combination, a plate metal top section, a pair of upright plate metal side sections under said top section and connected with the latter to form an inverted U-shaped structure, said top section having an upwardly arched wall portion spanning said side sections, and a forwardly extended portion overhanging the front edges of said side sections and closed at its top, front and sides; means at the lower ends of said side sections for rigidly mounting said inverted U-shaped structure on a pair of transversely spaced frame members of a motor vehicle; a web member secured to and extending from the inner sides of said side sections and being dished to form a fan shroud within said U-shaped structure, said web member having an upper edge portion connected with the inner side of said upwardly arched wall portion, and being formed of plate material of substantial thickness so that said U-shaped structure will be substantially reinforced by said web member; and a pair of upright reinforcing angles positioned, respectively, at the inner sides of said side sections, each reinforcing angle having one of its flanges set on edge against and secured to said web member, and having its other flange set on edge against and secured to the respective side member.

MICHAEL TOTH.

REFERENCES CITED

The following references are of record in the file of this patent:

UNITED STATES PATENTS

| Number | Name | Date |
|---|---|---|
| 1,374,394 | Ross | Apr. 12, 1921 |
| 1,593,242 | Cutler | July 20, 1926 |
| 1,593,244 | Cutler | July 20, 1926 |
| 1,631,846 | Wilson | June 7, 1927 |
| 1,648,804 | Griese | Nov. 8, 1927 |
| 1,694,696 | Young | Dec. 11, 1928 |
| 1,723,813 | Schneider | Aug. 6, 1929 |
| 1,755,370 | Smith | Apr. 22, 1930 |
| 1,838,114 | Schulman | Dec. 29, 1931 |
| 2,086,172 | Northup | July 6, 1937 |
| 2,117,040 | Schjolin | May 10, 1938 |
| 2,152,579 | Baker et al. | Mar. 28, 1939 |
| 2,170,524 | Agerell et al. | Aug. 22, 1939 |
| 2,173,338 | Morris | Sept. 19, 1939 |
| 2,468,809 | Brock et al. | May 3, 1949 |